US008273853B2

(12) United States Patent
Birnbrich et al.

(10) Patent No.: US 8,273,853 B2
(45) Date of Patent: Sep. 25, 2012

(54) EMULSIFIERS FOR EPOXY RESINS

(75) Inventors: Paul Birnbrich, Solingen (DE);
Hans-Josef Thomas, Korschenbroich (DE); Giorgio Sabbadini, Rho (IT);
Ulrich Nagorny, Hilden (DE); Georg Bourscheidt, Düsseldorf (DE)

(73) Assignee: Cognis IP Management GmbH, Duesseldorf (DE)

( * ) Notice: Subject to any disclaimer, the term of this patent is extended or adjusted under 35 U.S.C. 154(b) by 631 days.

(21) Appl. No.: 12/417,809

(22) Filed: Apr. 3, 2009

(65) Prior Publication Data
US 2009/0253860 A1 Oct. 8, 2009

(30) Foreign Application Priority Data

Apr. 5, 2008 (EP) ..................................... 08006898

(51) Int. Cl.
*C08G 65/00* (2006.01)
*C08G 65/22* (2006.01)
*C08G 65/24* (2006.01)
*C08G 65/26* (2006.01)
*C08G 65/28* (2006.01)
*C07D 303/02* (2006.01)
*C07D 301/27* (2006.01)
*C07D 301/28* (2006.01)

(52) U.S. Cl. ................ 528/397; 516/9; 516/20; 516/72; 516/920; 524/612; 524/765; 524/766; 528/365; 528/366; 528/370; 528/372; 528/393; 528/396; 528/419; 528/421; 570/114; 570/116; 549/512; 549/513; 549/514; 549/516

(58) Field of Classification Search ............... 516/9, 20, 516/53, 72, 920, DIG. 1, DIG. 2, FOR. 100, 516/FOR. 123, FOR. 156; 523/400, 402; 524/201, 503, 612, 766, 765, 768; 528/365, 528/366, 370, 371, 372, 392, 393, 396, 397, 528/419, 421; 549/512, 513, 514, 516; 570/114, 570/116

See application file for complete search history.

(56) References Cited

U.S. PATENT DOCUMENTS

| 5,236,974 A | * | 8/1993 | Dreischhoff et al. | ......... 523/403 |
| 5,673,506 A | | 10/1997 | Pantuso et al. | |
| 5,763,506 A | | 6/1998 | Papalos et al. | |
| 2001/0027227 A1 | * | 10/2001 | Breindel et al. | .............. 523/400 |

FOREIGN PATENT DOCUMENTS

| EP | 0709418 | 5/1996 |
| GB | 679536 | 9/1952 |

OTHER PUBLICATIONS

European Search Report in EP 08 00 6898, dated Aug. 19, 2008, 2 pgs.

* cited by examiner

*Primary Examiner* — Ling Choi
*Assistant Examiner* — Darcy D Laclair
(74) *Attorney, Agent, or Firm* — Diehl Servilla LLC

(57) ABSTRACT

Disclosed is a process for the preparation of emulsifiers E1 which are obtained by (a) reacting a polyol with propylene oxide or a mixture of ethylene oxide and propylene oxide, to give an intermediate Z1, (b) reacting the intermediate Z1 with epichlorohydrin, forming an intermediate Z2, (c) reacting the intermediate Z2 with an adduct of ethylene oxide or a mixture of ethylene oxide and propylene oxide, with a C1-C22 monoalcohol, provided that on average at least one epoxide function of the intermediate Z2 is reacted and on average at least one epoxide function originating from the intermediate Z2 is retained. Compounds E1 are suitable as emulsifiers for preparing aqueous emulsions or dispersions of epoxy resins.

8 Claims, No Drawings

EMULSIFIERS FOR EPOXY RESINS

CROSS-REFERENCE

This application claims the priority of EPO Application No. EP 08 00 6898.4 filed Apr. 5, 2008 which is incorporated herein by reference in its entirety.

FIELD OF THE INVENTION

The invention relates to emulsifiers for epoxy resins which are not self-emulsifying in water, additionally to emulsifier mixtures, and, finally, to aqueous epoxy resin preparations comprising the emulsifiers for inventive use.

BACKGROUND OF THE INVENTION

Epoxy resin emulsions have been known for a long time and have been diversely described in the literature. The term "epoxy resin emulsions" is understood below to refer to aqueous systems which comprise emulsified or dispersed epoxy resins.

Epoxy resin emulsions are used predominantly as coating materials in combination with suitable curing agents. Fundamental differences of epoxy resin emulsions versus other types of emulsions are firstly the nature of the stabilization, and secondly the average molar mass of the epoxy resins used.

Hence, there are numerous patent applications on the preparation of solid-resin dispersions wherein the average molecular weight of the epoxy resin is in the range between 900 and 1200, and which have an epoxide equivalent weight (EEW, Epoxy Equivalent Weight), in the range of about 450-600. Most of the emulsifiers used in this case possess epoxide groups and therefore become part of the cured coating; a term also used in this context is that of reactive emulsifiers. In the course of the solid-resin synthesis, reactive emulsifiers are incorporated into the polymer that forms.

Epoxy resin emulsions generally contain certain amounts (typically 3-13%) of solvents for the purpose of improving film formation in the subsequent application, or of reducing the in-process viscosity during preparation of the dispersion, and also comprise reactive diluents and further additives for improving the storage stability.

In the preparation of liquid-resin emulsions it is usual to use external emulsifiers for the purpose of stabilization. These are usually specialty surfactants which in the subsequent application do not become part of the coating and are therefore able to diffuse out of the cured film.

DETAILED DESCRIPTION OF PREFERRED EMBODIMENTS

Emulsifiers

It was an object of the present invention to provide emulsifiers for epoxy resins. The substances identified as emulsifiers ought to be capable of emulsifying or dispersing epoxy resins in water. The emulsifiers ought additionally to be reactive emulsifiers; this means that these emulsifiers should not only be capable of emulsifying or dispersing epoxy resins in aqueous systems but should also themselves become part of the polymer formed in the course of the curing of the system—in other words, are integrated as a unit into this polymer—following addition of a suitable epoxy resin curing agent.

The emulsifiers in accordance with the invention are preferably capable of emulsifying or dispersing epoxy resins in water, without the need for supporting addition of organic solvents.

The aqueous epoxy resin emulsions and dispersions prepared using the emulsifiers of the invention are, furthermore, to be distinguished by storage stability and by good freeze/thaw stability.

An emulsion is termed adequately storage-stable if after at least six months' storage at room temperature (20° C.) there is no significant perceptible change in the particle size and particle distribution (particle size <1 μm in the case of monomodal distribution) and also if no perceptible sedimentation occurs. The assessment of the storage stability can be accelerated by storage at elevated temperature (50-55° C.); in that case, the criteria specified above apply after 4 weeks' storage at elevated temperature.

Characterization of the freeze/thaw stability of an emulsion is likewise based on the criteria specified above; in this case, the emulsion is expected to withstand intact at least three cycles (freezing of the emulsion for eight hours, followed by thawing by slow warming to room temperature).

Surprisingly it has been found that the emulsifier compounds E1 identified in more detail below, and in particular their combination with the emulsifier compounds E2 likewise identified in more detail below, are able excellently to meet the stated objects.

The invention first provides the compounds E1, which are obtained by (a) reacting 1 mole of a polyol having at least three OH groups, selected from the group consisting of pentaerythritol and trimethylolpropane, with 1 to 100 mole of propylene oxide or with 1 to 100 mole of a mixture of ethylene oxide and propylene oxide containing at least 65 mole % propylene oxide, based on the sum of ethylene oxide and propylene oxide, to give an intermediate Z1, (b) reacting the intermediate Z1 with epichlorohydrin, with the proviso that on average at least two of the OH groups present in Z1 are reacted, forming an intermediate Z2, (c) reacting the intermediate Z2 with an adduct of 10 to 100 mole of ethylene oxide or 10 to 100 mole of a mixture of ethylene oxide and propylene oxide containing at least 65 mole % ethylene oxide, based on the sum of ethylene oxide and propylene oxide, with 1 mole of a monoalcohol with 1 to 22 C atoms, with the proviso that on average at least one epoxide function of the intermediate Z2 is reacted and on average at least one epoxide function originating from the intermediate Z2 is retained.

Additionally provided by the invention is the use of compounds E1, which are obtained by (a) reacting 1 mole of a polyol having at least three OH groups, selected from the group consisting of pentaerythritol and trimethylolpropane, with 1 to 100 mole of propylene oxide or with 1 to 100 mole of a mixture of ethylene oxide and propylene oxide containing at least 65 mole % propylene oxide, based on the sum of ethylene oxide and propylene oxide, to give an intermediate Z1, (b) reacting the intermediate Z1 with epichlorohydrin, with the proviso that on average at least two of the OH groups present in Z1 are reacted, forming an intermediate Z2, (c) reacting the intermediate Z2 with an adduct of 10 to 100 mole of ethylene oxide or 10 to 100 mole of a mixture of ethylene oxide and propylene oxide containing at least 65 mole % ethylene oxide, based on the sum of ethylene oxide and propylene oxide, with 1 mole of a monoalcohol with 1 to 22 C atoms, with the proviso that on average at least one epoxide function of the intermediate Z2 is reacted and on average at least one epoxide function originating from the intermediate Z2 is retained, as emulsifiers for epoxy resins, suitable for preparing aqueous emulsions or dispersions of epoxy resins.

As throughout the art, aqueous emulsions or dispersions of epoxy resins are to be taken to refer, customarily, to systems in which epoxy resins are in emulsified or dispersed form in an aqueous system, and in particular in water, the emulsification or dispersion being brought about by means of an emulsifier which is present in this system.

As already mentioned, the emulsifiers of the invention are reactive emulsifiers, since they contain per molecule on average at least one free epoxy function. Accordingly, in the course of a subsequent curing operation, in the presence of added epoxy resin curing agent, they are able to react and so, as soon as they have fulfilled their emulsifying or dispersing action for epoxy resins in aqueous systems, following the evaporation of the water from the coating, they become part of the polymer.

In one embodiment, compounds E1 are prepared using exclusively propylene oxide in step (a).

In one embodiment, compounds E1 are prepared by reacting exclusively propylene oxide in step (a), with the proviso that 1 mole of the polyol is reacted with 3 to 20 mole of propylene oxide.

In one embodiment the compounds E1 are prepared in step (c) by reacting the intermediate Z2 with an adduct of 10 to 50 mole of ethylene oxide with 1 mole of a monoalcohol having 1 to 4 C atoms.

The invention additionally provides emulsifier mixtures composed of 1-99% by weight of the abovementioned compounds E1 and of a further epoxy resin emulsifier E2 which is different from E1. The epoxy resin emulsifier E2 is preferably a reaction product of a diol having an average molecular weight in the range from 200 to 20 000 which is selected from the group consisting of polyethylene glycols, polypropylene glycols, and EO/PO block polymers with bisphenol A diglycidyl ether.

In one especially preferred embodiment use is made as emulsifier combination E1/E2 of a mixture of the substances specified in examples 1 and 2 (see below).

The invention additionally provides aqueous epoxy resin preparations in the form of emulsions or dispersions of one or more epoxy resins in water, comprising—based on the overall system—1% to 70% by weight of an epoxy resin and 0.1% to 50% of the abovementioned epoxy resin emulsifier E1, preferably 0.1 to 20%, more preferably 0.1-10% of the emulsifier E1.

In one embodiment these aqueous epoxy resin preparations further comprise—based on the overall system—0.1-50% by weight of a further epoxy resin emulsifier E2 which is different from E1. Preferably E2 is a reaction product of a diol having an average molecular weight in the range from 200 to 20 000 which is selected from the group consisting of polyethylene glycols, polypropylene glycols, and EO/PO block polymers with bisphenol A diglycidyl ether. Preferably, the emulsifier E2 is used in concentrations of 0.5-20%, more preferably in concentrations of 0.5-10%.

In one especially preferred embodiment, these aqueous epoxy resin preparations comprise as emulsifier combination E1/E2 a mixture of the substances specified in examples 1 and 2 and in examples 1 and 3 (see below).

In one preferred embodiment, the aqueous epoxy resin preparations of the invention, especially those which comprise the emulsifier combination E1/E2, have the following properties:

Brookfield viscosity ≦2000 mPas (at 25° C.)
particle size ≦1 µm
solids content: about 65%
storage stability ≧6 months
freeze/thaw stability ≧3 cycles.

The Epoxy Resins (for Emulsification)

The epoxy resins H employed in the context of the present invention which, as indeed mentioned, are substances to be dispersed or emulsified in water, are not subject per se, with regard to their nature, to any restriction, apart from the fact that epoxy resins which are self-dispersing or self-emulsifying in water at 20° C. are excluded (since they do not require an emulsifier).

The epoxy resins H are in particular polyepoxides—not self-dispersing or not self-emulsifying in water—having on average at least two epoxide groups per molecule. These epoxide compounds may be both saturated and unsaturated, and also aliphatic, cycloaliphatic, aromatic or heterocyclic, and may also contain hydroxyl groups. They may additionally include substituents which under the conditions of mixing and of reaction do not give rise to disruptive side reactions, examples being alkyl or aryl substituents, ether moieties and the like. These epoxide compounds are preferably polyglycidyl ethers based on polyhydric, preferably dihydric, alcohols, phenols, hydrogenation products of these phenols and/or on novolaks (reaction products of monohydric or polyhydric phenols with aldehydes, especially formaldehyde in the presence of acidic catalysts). The epoxide equivalent weights (EEW) of these epoxide compounds are preferably between 100 and 2000, in particular between 170 and 250. The epoxide equivalent weight of a substance is defined as the amount of the substance (in grams) that contains 1 mol of oxirane rings.

Suitable polyhydric phenols are preferably the following compounds: resorcinol, hydroquinone, 2,2-bis(4-hydroxyphenyl)propane (bisphenol A), isomer mixtures of dihydroxydiphenylmethane (bisphenol F), tetrabromobisphenol A, 4,4'-dihydroxydiphenylcyclohexane, 4,4'-dihydroxy-3,3-dimethyldiphenylpropane, 4,4'-dihydroxybiphenyl, 4,4'-dihydroxybenzophenol, 1,1-bis(4-hydroxyphenyl)ethane, 1,1-bis(4-hydroxyphenyl)isobutane, bis(4-hydroxyphenyl)methane, bis(4-hydroxy-phenyl)ether, bis(4-hydroxyphenyl)sulfone, and the like, and also the chlorination and bromination products of the aforementioned compounds; in this context bisphenol A is especially preferred.

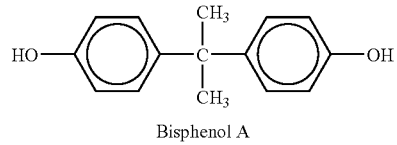

Bisphenol A

The polyglycidyl ethers of polyhydric alcohols are also suitable as epoxy resins H. Examples of such polyhydric alcohols include ethylene glycol, diethylene glycol, triethylene glycol, 1,2-propylene glycol, polyoxy-propylene glycol (n=1-20), 1,3-propylene glycol, 1,4-butylene glycol, 1,5-pentanediol, 1,6-hexanediol, 1,2,6-hexanetriol, glycerol, isosorbide, and 2,2-bis(4-hydroxycyclohexyl)-2,2-propane.

It is also possible as epoxy resins H to use polyglycidyl esters of polycarboxylic acids, which are obtained by the reaction of epichlorohydrin or of similar epoxy compounds with an aliphatic, cycloaliphatic or aromatic polycarboxylic acid, such as oxalic acid, succinic acid, adipic acid, glutaric acid, phthalic acid, terephthalic acid, hexahydrophthalic acid, 2,6-naphthalenedicarboxylic acid, and dimerized linolenic acid. Examples are diglycidyl adipate, diglycidyl phthalate, and diglycidyl hexahydrophthalate.

Mixtures of two or more epoxy resins H can also be used.

Moreover, it is possible to use epoxy resins solid at 20° C. and epoxy resins liquid at 20° C. The liquid epoxy resins are in particular those which at 20° C. have a Brookfield viscosity in the range from 500 to 20 000 mPas.

One particularly preferred embodiment uses liquid epoxy resins H which have an average molecular weight in the range from 340 to 400 and in particular 370 to 385.

Preparation of Aqueous Emulsions/Dispersions

The preparation of aqueous emulsions or dispersions of epoxy resins using the emulsifiers E1 or a mixture of emulsifiers E1/E2 may take place in accordance with all of the methods that are known to the person skilled in the art. Thus both the technical literature and the patent literature contain numerous examples of emulsification methods. The following literature provides an exemplary demonstration of the breadth of the methods that are possible:

E. M. Michalski/M. Ehreiser, Farbe & Lack August 2006, pages 22-26
EP 0941286, Examples 5-11,
Technical Data Sheet for "Disponil® 23", guideline formula (Cognis GmbH).

EXAMPLES

Abbreviations:
EEW=epoxide equivalent weight (Epoxy Equivalent Weight)
rpm=revolutions per minute
Substances Used:
Polyglykol M2000S: Commercial product from Clariant
ZP: Glycidyl ether of pentaerythritol-5.5 PO (adduct of 5.5 mole of propylene oxide with 1 mole of pentaerythritol)
Anchor® 1040: Catalyst, BF3-amine complex from Air Products
Pluronic® PE 6800 EO/PO block polymer, a commercial product from BASF
Bisphenol A diglycidyl ether: "DER 331", commercial product from DOW
Pluronic® F 88: EO/PO block polymer, commercial product from BASF Example 1

Reactive Emulsifier A

In a 1-L four-neck flask equipped with stirrer, thermometer, reflux condenser, and nitrogen blanketing, 330 g (0.1681 mol) of Polyglykol M2000S and 110 g (0.4950 equivalent of epoxide) of ZP were weighed out and melted with oil bath heating. The homogenized melt was admixed at 104° C. with 2.1 g of Anchor® 1040, with stirring, and the mixture was heated to 130-133° C. After 5 hours' reaction time at the stated temperature, an epoxide number of 1.19% epoxide oxygen and an EEW of 1344.5 g/equivalent were found, and the contents of the flask were cooled to about 70° C. and discharged.

This gave 431.8 g of a slightly opaque, pale yellow melt, which solidified at room temperature.

Example 2

Reactive Emulsifier B

In a 1-L four-neck flask equipped with stirrer, thermometer, reflux condenser, and nitrogen blanketing, 297.1 g (0.0354 mol) of Pluronic® PE 6800 and 200.9 g (0.5259 mol) of bisphenol A diglycidyl ether were weighed out and melted with oil bath heating. The homogenized melt was admixed at 106° C. with 4.0 g of Anchor® 1040, with stirring, and the mixture was heated to 140° C. After 3 hours' reaction time at the stated temperature, an epoxide number of 2.78% epoxide oxygen was found and the contents of the flask were cooled to 130° C. When the temperature was reached, a further 502 g of bisphenol A diglycidyl ether were added rapidly and, following thorough mixing and cooling to about 70° C., the product was discharged. This gave 975.0 g of a distinctly opaque, viscous, pale yellow liquid, which solidified at room temperature.

Example 3

Reactive Emulsifier C

In a 1-L four-neck flask equipped with stirrer, thermometer, reflux condenser, and nitrogen blanketing, 297.1 g (0.0354 mol) of Pluronic® F88 and 200.9 g (0.5259 mol) of bisphenol A diglycidyl ether were weighed out and melted with oil bath heating. The homogenized melt was admixed at 109° C. with 2.0 g of Anchor® 1040, with stirring, and the mixture was heated to 130° C. After 3 hours' reaction time at the stated temperature, an epoxide number of 2.93% epoxide oxygen was found and the contents of the flask were cooled to 102° C. When the temperature was reached, a further 500 g of bisphenol A diglycidyl ether were added rapidly and, following thorough mixing and cooling to about 70° C., the product was discharged. This gave 970.3 g of a slightly opaque, viscous, pale yellow liquid, which solidified at room temperature.

Example 4

Reactive Emulsifier D

In a 1-L four-neck flask equipped with stirrer, thermometer, reflux condenser, and nitrogen blanketing, 330 g (0.1681 mol) of Polyglykol M2000S and 128.7 g (0.4942 equivalent of epoxide) of ZP were weighed out and melted with oil bath heating. The homogenized melt was admixed at 81° C. with 1.8 g of Anchor® 1040, with stirring, and the mixture was heated to 130-133° C. In the course of the reaction a total of 1.0 g of Anchor® 1040 was metered in subsequently, in four portions. After 16 hours' reaction time at the stated temperature, an epoxide number of 0.97% epoxide oxygen and an EEW of 1649 g/equivalent were found, and the contents of the flask were cooled to about 70° C. and discharged.

This gave 443.4 g of a slightly opaque, red-brown melt, which solidified at room temperature.

Example 5

Emulsion Preparation

In an aluminum beaker with a volume of 250 ml, 80 g (0.2094 mol) of bisphenol A diglycidyl ether and 20 g (0.0107 equivalent of epoxide) of the reactive emulsifier D described in Example 4 were weighed out and homogenized with gentle heating by means of a Pendraulik stirrer equipped with a 38 mm toothed dispersing disk (stirring setting 1-2). Following complete homogenization, 20 g of fully demineralized water were added in portions by means of a dropping pipette, with stirring (setting 1). This produced initially a W/O emulsion, which then rapidly underwent inversion to form an O/W emulsion. Following phase inversion, dispersion took place for 20 minutes at stirring setting 4, followed by slow addition with the aid of a dropping funnel, over a period of 1 h, of 60 g of water. This gave 172 g of a highly mobile, white emulsion having an EEW of 410 g/equivalent, a viscosity of 70 mPas (Brookfield, 25° C., spindle 31, 50 rpm), and an average particle size of 718 nm (Coulter LS 13-320, laser light scattering).

Example 6

Emulsion Preparation

In a 2-L laboratory reactor with ground joints, equipped with stirrer, reflux condenser, dropping funnel, thermometer, and oil bath heating, 500 g (1.3089 mol) of bisphenol A diglycidyl ether, 62.5 g (0.0379 equivalent of epoxide) of the reactive emulsifier A described in Example 1, and 62.5 g (0.2208 equivalent of epoxide) of the reactive emulsifier B described in Example 2 were weighed out. The components were heated to 50° C. with stirring and homogenized for 60 min, then cooled to 35° C. 125.0 g of fully demineralized water were added in 7 min via a dropping funnel. The initial product was a W/O emulsion, which in the course of homogenization immediately underwent inversion to form an O/W emulsion. The emulsion thus formed was homogenized for 20 min at maximum stirring speed, then diluted slowly (about 1.5 h) with a total of 183 g of fully demineralized water. Following further homogenization (about 1 h) it was discharged via a rapid ED sieve, 1000 µm. This gave 892.8 g of a white, slightly viscous emulsion having an EEW (epoxide equivalent weight) of 316.2 and a viscosity (Brookfield, 25° C., spindle 31, 50 rpm) of 1930 mPas, and an average particle size of 538 nm (Coulter LS 13-320, laser light scattering).

Example 7

Emulsion Preparation

In a 1-L laboratory reactor with ground joints, equipped with stirrer, reflux condenser, dropping funnel, thermometer, and oil bath heating, 364.0 g (0.9529 mol) of bisphenol A diglycidyl ether, 24.0 g (0.0833 equivalent of epoxide) of the reactive emulsifier B described in Example 2, and 12.0 g (0.0088 equivalent of epoxide) of the reactive emulsifier A described in Example 1 were weighed out and heated to 60° C. with stirring. Then the stirrer was shut off and 44.0 g of fully demineralized water were added rapidly. When the stirrer was switched on again, an O/W emulsion was obtained immediately, the temperature dropping to 53° C. The emulsion was stirred at 400 rpm for 30 min and then diluted slowly with 171.7 g of fully demineralized water over a period of about 1.5 h. In the course of this procedure the temperature dropped from 46° C. to 38° C.

The finished emulsion was homogenized at 38-33° C. for 2 h and discharged via a rapid ED sieve, 1000 µm. This gave 572.8 g of a white, slightly viscous emulsion having an EEW of 304.6 eq/g and also a viscosity (Brookfield, 25° C., spindle 31, 50 rpm) of 1510 mPas, and an average particle size of 722 nm (Coulter LS 13-320, laser light scattering).

Example 8

Emulsion Preparation

In a 1-L laboratory reactor with ground joints, equipped with stirrer, reflux condenser, dropping funnel, thermometer, and oil bath heating, 340.0 g (0.8901 mol) of bisphenol A diglycidyl ether, 40.0 g (0.1434 equivalent of epoxide) of the reactive emulsifier C described in Example 3, and 20.0 g (0.0139 equivalent of epoxide) of the reactive emulsifier A described in Example 1 were weighed out and heated to 60° C. with stirring. Then the stirrer was shut off and 48.0 g of fully demineralized water were added rapidly. When the stirrer was switched on again, an O/W emulsion was obtained immediately, the temperature dropping to 52° C. The emulsion was stirred at 400 rpm for 30 min and then diluted slowly with 167.7 g of fully demineralized water over a period of about 1.5 h. In the course of this procedure the temperature dropped from 52° C. to 35° C. The finished emulsion was homogenized with gentle heating at 35-50° C. for 1 h and, after a standing time of 2 h at 50° C., was discharged via a rapid ED sieve, 1000 µm. This gave 573.6 g of a white, slightly viscous emulsion having an EEW of 312.6 eq/g and also a viscosity (Brookfield, 25° C., spindle 31, 50 rpm) of 628 mPas, and an average particle size of 490 nm (Coulter LS 13-320, laser light scattering).

What is claimed is:

1. A process for the preparation of emulsifiers E1, comprising:
    (a) reacting a polyol having at least three OH groups, with an alkylene oxide selected from the group consisting of propylene oxide and a mixture of ethylene oxide and propylene oxide containing at least 65 mole % propylene oxide, based on the sum of ethylene oxide and propylene oxide, to give an intermediate Z1 having at least two OH groups,
    (b) reacting said intermediate Z1 with epichlorohydrin, provided that on average at least two of the OH groups present in Z1 are reacted, thereby forming an intermediate Z2 having at least two epoxide groups, and
    (c) reacting said intermediate Z2 with an adduct of an alkylene oxide selected from the group consisting of ethylene oxide and a mixture of ethylene oxide and propylene oxide containing at least 65 mole % ethylene oxide, based on the sum of ethylene oxide and propylene oxide, with at least one C1-C22 monoalcohol, provided that on average at least one epoxide group of said intermediate Z2 is reacted and on average at least one epoxide group originating from said intermediate Z2 is retained, thereby providing compounds E1.

2. The process of claim 1, wherein said polyol of step (a) is selected from the group consisting of pentaerythritol and trimethylolpropane.

3. The process of claim 1, wherein the ratio of said polyol to said alkylene oxide of step (a) is about 1:1 to about 1:100.

4. The process of claim 1, wherein the ratio of said alkylene oxide to said monoalcohol of step (c) is about 10:1 to about 100:1.

5. A method of preparing aqueous emulsions or dispersions of epoxy resins comprising:
    (a) providing at least one emulsifier E1, obtained by the process of claim 1;
    (b) adding at least one epoxy resin, and
    (c) emulsifying with water.

6. The process of claim 1, wherein said alkylene oxide of reaction step (a) is exclusively propylene oxide.

7. The process of claim 6, wherein reaction step (a) uses about 3 to about 20 moles of propylene oxide per mole of polyol.

8. The process of claim 1, wherein step (c) consists of reacting said intermediate Z2 with an adduct of about 10 to about 50 moles of ethylene oxide per mole of a C1-C4 monoalcohol.

* * * * *